(No Model.)
G. W. TAYLOR.
SHEET METAL CAN.
No. 315,854. Patented Apr. 14, 1885.
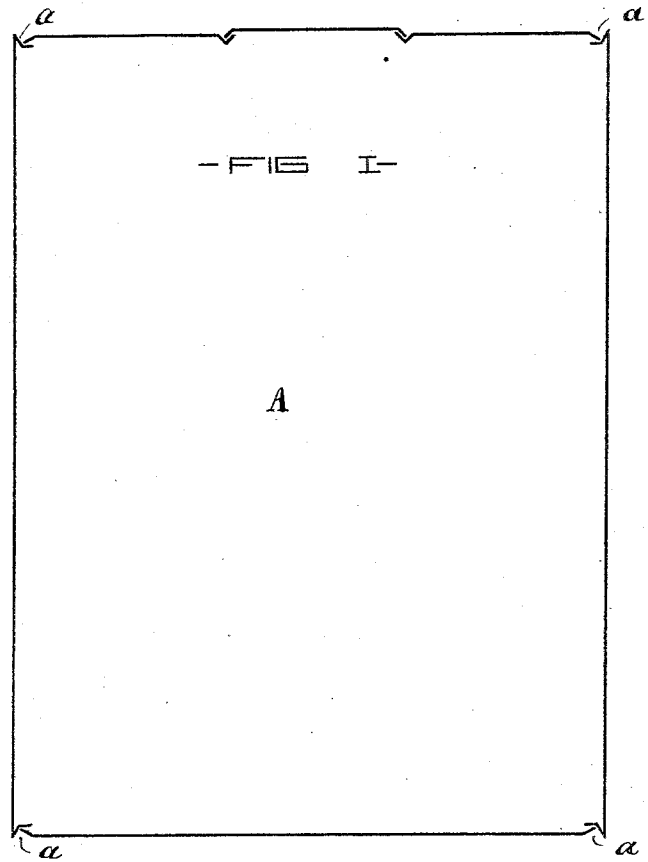
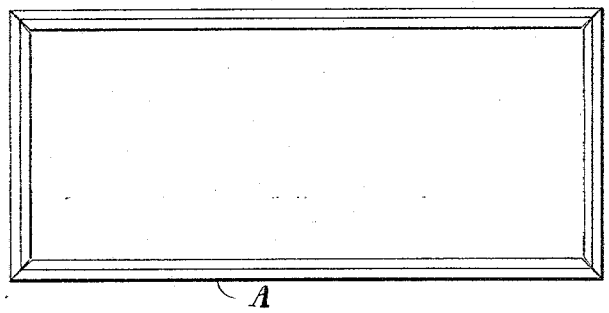
WITNESSES
Danl Fisher
S. D. Warfield
INVENTOR
George W. Taylor,
by G. H. & W. T. Howard,
attys.

UNITED STATES PATENT OFFICE.

GEORGE W. TAYLOR, OF BALTIMORE, MARYLAND.

SHEET-METAL CAN.

SPECIFICATION forming part of Letters Patent No. 315,854, dated April 14, 1885.

Application filed October 17, 1882. Renewed October 16, 1884. (No model.)

*To all whom it may concern:*

Be it known that I, GEORGE W. TAYLOR, of the city of Baltimore and State of Maryland, have invented certain Improvements in Sheet-Metal Cans, of which the following is a specification.

This invention relates to certain improvements in what are known to the trade as "square cans"—that is to say, cans of a rectangular cross-section; and it consists in a novel construction of the ends of the can-body and the edges of the heads, whereby the can may be soldered from and on the outside without the solder projecting beyond the surface of the heads or the ends of the body.

In the further description of my invention which follows reference is made to the accompanying drawings, forming a part hereof, and in which—

Figure I is a vertical section of my improved can, and Fig. II is an end view of the can-body.

Similar letters of reference indicate similar parts in both views.

A is the can-body, the ends of which are flanged, as shown in the drawings—that is to say, they are turned in in such manner as to produce an edge and an inner flat surface upon which the head, the edge of which is slightly turned down or broken, is placed. By this means a channel or groove, *a*, is formed at the junction of the body and head, in which solder is introduced to form a joint.

It will be seen that with my invention the heads may be secured in place without the solder producing any rough surface or projection beyond the edges of the body or the outer surface of the heads.

I am aware that it is not new to provide a can-body with an inwardly-projecting flange at a right angle with the sides; but such flange has been used only with a practically flat head, or a head with a bead, which does not form in connection with the edge of the body a groove for solder.

I am also aware that a can-head with its edges turned down similar to the one described herein is not new. These heads have invariably been employed in connection with a V-groove, which is formed in an inwardly-projecting flange of the can-body.

In my invention I obtain a groove for the solder without subjecting the edges of the can-body to the strain necessary to effect the V-groove above referred to. I therefore do not claim, broadly, a can the ends of the body of which are turned down and inward; neither do I claim, broadly, the combination of a can-body with an inwardly-turned end and a head with the edges turned down; but What I do claim as my invention is—

In a sheet-metal can, the body having a depressed flange projecting inward at a right angle with the sides of the body, combined with a head the edges of which are turned down, as described, the said parts forming a groove for solder, substantially as specified.

GEORGE W. TAYLOR.

Witnesses:
 ED. J. DIGGS,
 WM. T. HOWARD.